Sept. 24, 1963  H. F. NEWCOMER  3,104,921
LUBRICATING MEANS FOR MACHINE TOOL SPINDLES
Filed March 17, 1961  2 Sheets-Sheet 2
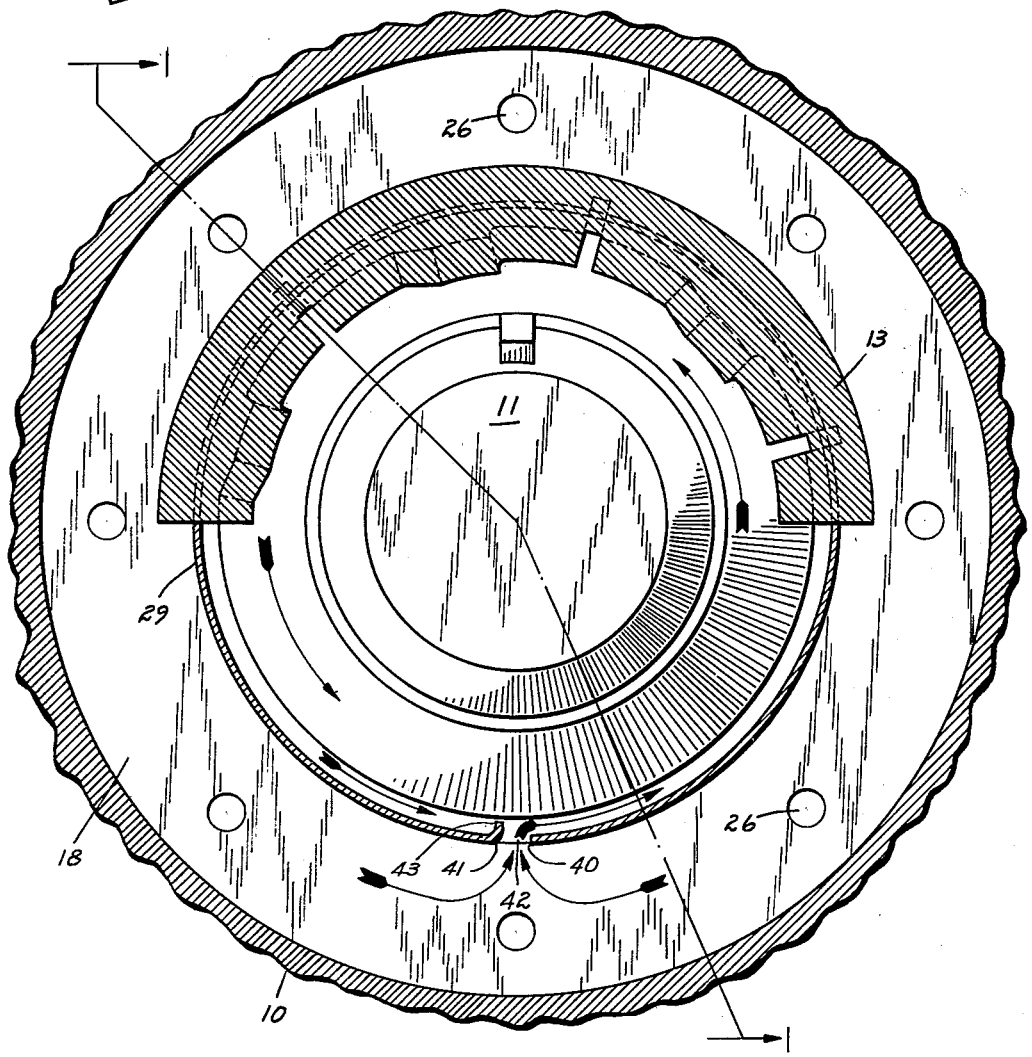
INVENTOR
HAROLD F. NEWCOMER
BY
ATTORNEY

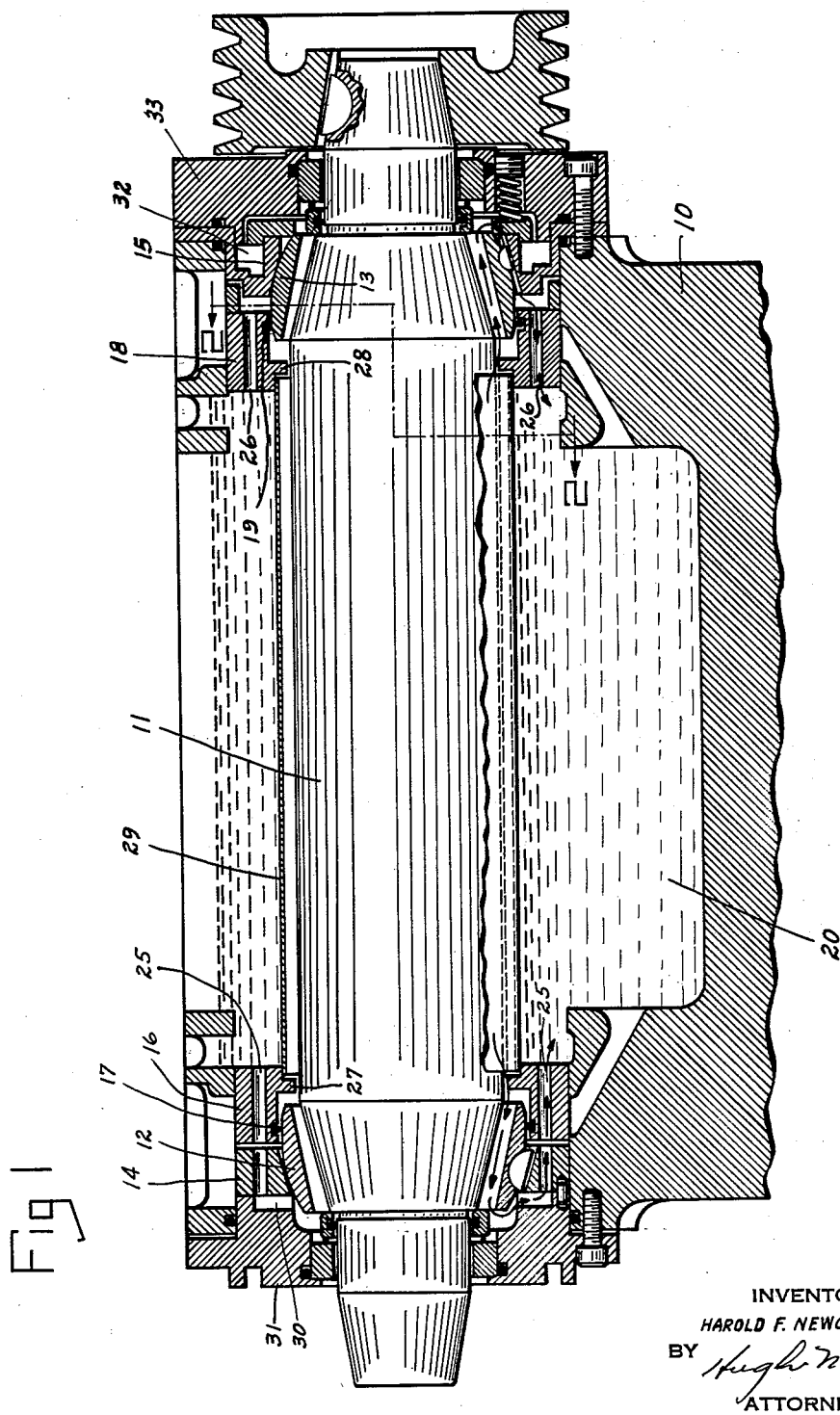

3,104,921
LUBRICATING MEANS FOR MACHINE TOOL SPINDLES
Harold F. Newcomer, Waynesboro, Pa., assignor to Landis Tool Company, Waynesboro, Pa.
Filed Mar. 17, 1961, Ser. No. 96,451
4 Claims. (Cl. 308—122)

This invention relates to machine tool spindle mountings, particularly to means for supplying lubricant to the bearings of such spindles.

It is generally known that when a spindle rotates in engagement with a body of fluid, particularly a liquid, it acts as a pump. This fact is used in bearing construction by designing the bearing to make use of the pump action of the journal to maintain a lubricant film between the bearings and the journal. This characteristic of the spindle is also used to circulate lubricant in the spindle mounting by means of the so-called oil slingers on the spindles adjacent the bearings. None of these devices is particularly efficient in the rate of circulation which it provides.

It is, therefore, an object of the present invention to provide a high volume rate of circulation of lubricant in a spindle mounting.

Another object is to provide means to make maximum use of the pump action of a spindle.

Another object is to increase the rate of heat transfer from the spindle bearings and from the lubricating fluid.

FIG. 1 is a sectional front elevation of a spindle mounting along the line 1—1 of FIG. 2.

FIG. 2 is a right hand end elevation, in section, of a spindle mounting showing the means for amplifying the pumping action of the spindle, along the line 2—2 of FIG. 1.

Housing 10 has a spindle 11 rotatably mounted in bearings 12 and 13. Bearing 12 is supported in retainer ring 14. Bearing 13 is supported in diaphragm retainer 15. Adjacent retainer ring 14 is a seal 16 having an O-ring 17 in contact with the outer surface of bearing 12. Adjacent the diaphragm retainer 15 is a seal 18 having an O-ring 19 in engagement with the outer surface of bearing 13.

Reservoir 20 in housing 10 is preferably filled with lubricant to a point above seals 16 and 18.

A plurality of angularly spaced passages 25 connect reservoir 20 with an annular recess 30 which is formed on the other side of bearing 12 by a cap and seal member 31. A plurality of angularly spaced passages 26 in seal 18 connect reservoir 20 with a recess 32 formed on the opposite side of bearing 13 by a cap and seal member 33. Seal 16 has a shoulder portion 27 and seal 18 has a shoulder portion 28 in which is supported a sleeve 29 surrounding spindle 11.

Sleeve 29 is formed by a piece of sheet metal, the ends 40 and 41 of which are spaced to provide an opening 42 through which lubricant may be drawn by the pumping action of spindle 11. The end 41 of sleeve 29 is turned inwardly toward spindle 11 to form a lip 43 which deflects the lubricant axially in opposite directions to circulate the lubricant through bearings 12 and 13. The rate of circulation is so high that it not only keeps down the temperature of the bearing, but increases the dissipation of heat from the lubricant through the walls of reservoir 20.

I claim:

1. A spindle mounting for a machine tool comprising a housing, axially spaced bearings in said housing, a spindle rotatably mounted in said bearings, said housing including a reservoir containing a body of lubricant in which said spindle and said bearings are submerged, means for circulating said lubricant to said bearings comprising a cylindrical member surrounding said spindle in radially spaced relation to said spindle to provide a pumping chamber in which a portion of the lubricant rotates with the spindle, and having a longitudinal opening to provide an inlet to said pumping chamber, a portion of said cylindrical member adjacent said opening being turned inwardly to deflect the lubricant rotating with said spindle in the direction of said bearings.

2. A spindle mounting for a machine tool comprising a housing, axially spaced bearings in said housing, a spindle rotatably mounted in said bearings, said housing including a reservoir containing a body of lubricant in which said spindle and bearings are submerged, means for circulating said lubricant around said bearings comprising a cylindrical member surrounding said spindle in radially spaced relation to said spindle and serving as a pumping chamber in which rotation of said spindle provides the pumping action, said cylindrical member being split longitudinally to provide an inlet to said pumping chamber, the portion of said cylindrical member adjacent said inlet being turned inwardly toward said spindle and serving as a baffle for directing lubricant rotating with said spindle in said pumping chamber, in opposite directions to each of said bearings.

3. A spindle mounting for a machine tool comprising a housing, axially spaced bearings in said housing, a spindle rotatably mounted in said bearings, said housing including a reservoir containing a body of lubricant in which said spindle and bearings are submerged, means for circulating said lubricant around said bearings comprising a cylindrical member surrounding said spindle in radially spaced relation to said spindle and serving as a pumping chamber in which rotation of said spindle provides the pumping action, a baffle extending axially and inwardly of said cylindrical member to direct fluid pumped by said spindle in a direction axially of said spindle and toward each of said bearings, and an opening in said cylindrical member to provide an inlet to said pumping chamber.

4. A spindle mounting for a machine tool comprising a housing, axially spaced bearings in said housing, a spindle rotatably mounted in said bearings, said housing including a reservoir containing a body of lubricant in which said spindle and bearings are submerged, means for circulating said lubricant around said bearings comprising a cylindrical member surrounding said spindle in radially spaced relation to said spindle and serving as a pumping chamber in which rotation of said spindle provides the pumping action, a baffle extending axially and inwardly of said cylindrical member to direct fluid pumped by said spindle in a direction axially of said spindle and toward each of said bearings, and an opening in said cylindrical member adjacent said baffle and positioned from said baffle in the direction of rotation of said spindle to provide an inlet to said pumping chamber.

References Cited in the file of this patent

OTHER REFERENCES

| 1,355,652 | Coppus et al. | Oct. 12, 1920 |
| 1,676,894 | Frank | July 10, 1928 |
| 2,861,848 | Lovelock et al. | Nov. 25, 1958 |